March 13, 1951 B. L. D. LAMY 2,545,235
FOUR-WHEELED CARRY SCRAPER
Filed Dec. 21, 1945 3 Sheets-Sheet 1

Inventor
*B.L.D. LAMY*

Patented Mar. 13, 1951

2,545,235

UNITED STATES PATENT OFFICE 2,545,235

FOUR-WHEELED CARRY SCRAPER

Bernard Lucien Désiré Lamy, Chateauneuf d'Isere, France

Application December 21, 1945, Serial No. 636,371
In France December 29, 1944

6 Claims. (Cl. 37—126)

This invention relates to earth moving devices and, more particularly, to an improved scraper for loading material, transporting it to a dump, and discharging the material.

Scrapers of this type comprise a scraper pan mounted on a suitable carriage and mechanism for causing the pan to dig into the earth as the pan is pulled along by the scraper. When the pan is filled, it is moved from the digging position to the carrying position so that the carriage may transport the pan to the dump. Suitable mechanism is provided to tilt the pan to the discharge position and open a door so as to discharge the contents of the pan.

In accordance with the present invention, a novel supporting arrangement for the pan is provided so that the pan may be positioned in the digging, carrying, and discharge position by means of the combined action of a single pan actuating rope or cable and gravity. Additionally, a door is provided for the open end of the pan and so cooperatively arranged with the pan supporting arrangement as to be automatically opened in the digging and discharge positions of the pan while being held closed in the carrying position of the pan.

Further features of the invention will be apparent from the following description with reference to the accompanying drawings which show by way of example an embodiment of the invention, and in which:

Fig. 1a is an enlarged cross-section along line A—B in Fig. 1.

Figure 1:
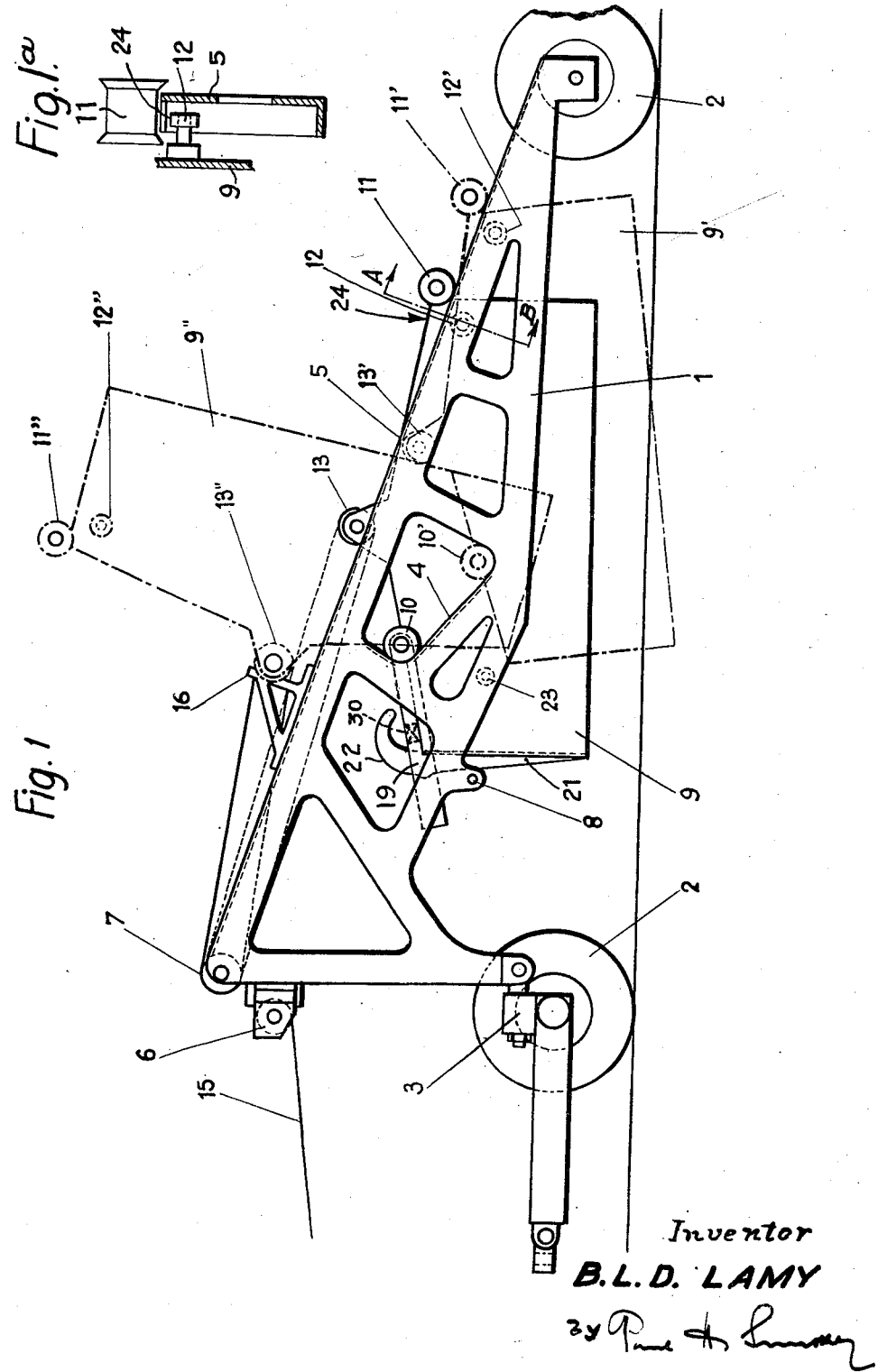
Fig. 1 is a side elevational view showing a wheeled scraper according to the invention.
Figure 2:
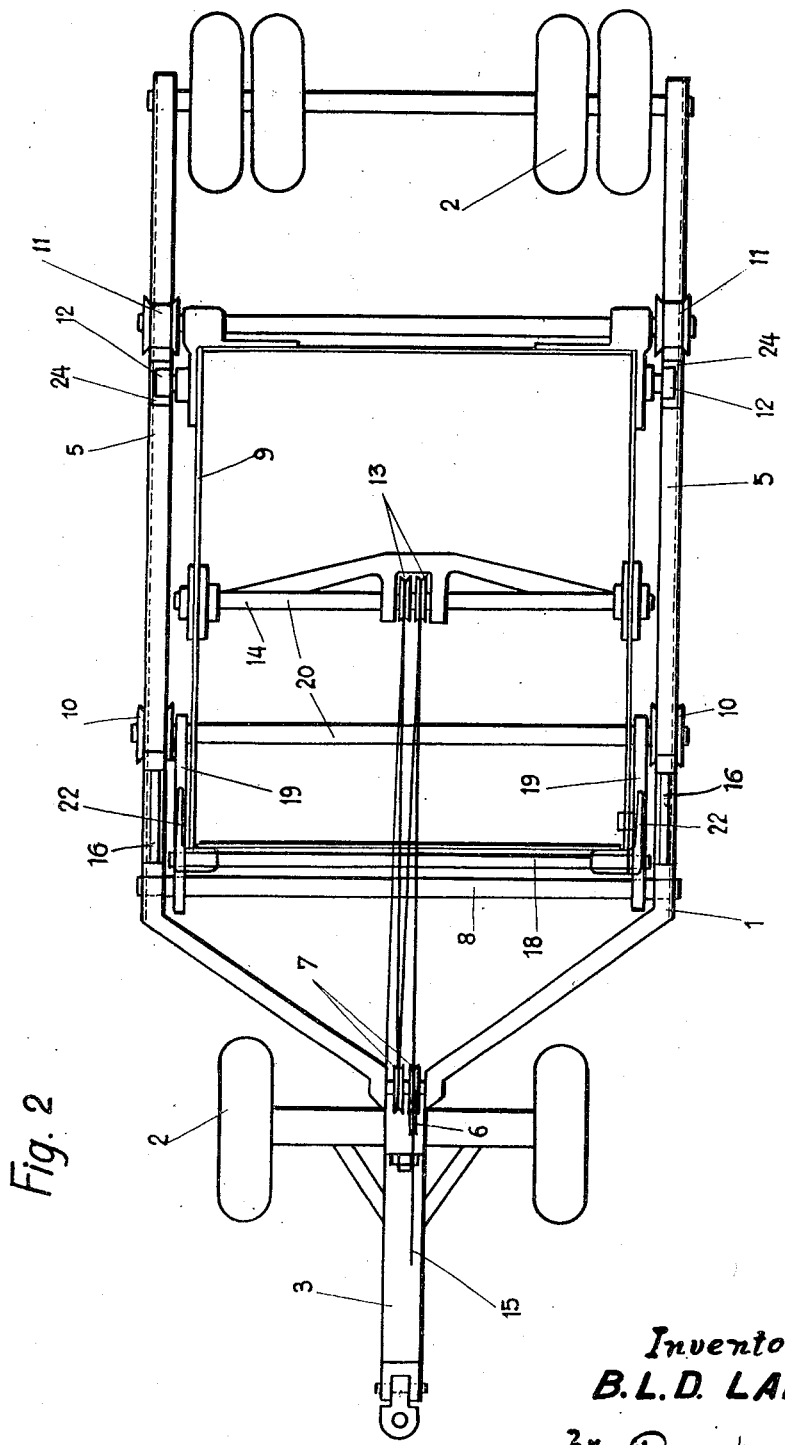
Fig. 2 is a plan view corresponding to Fig. 1.

Referring to the drawings, a tractor, for example a "Caterpillar" tractor (not shown), is yoked with a towed wheeled carriage 1 comprising a frame mounted on field tired wheels 2, of which the forward dirigible set of wheels 3 may be detachable.

Carriage 1 includes parallel, longitudinal open side frames which are converged at their forward ends for support upon the axle of the dirigible forward wheels 3. An axle extending between the forward ends of the side frames rotatably supports sheaves 7 and, beneath these sheaves, a sheave 6 is mounted on a bracket for swinging movement in a horizontal plane. A tie rod 8 interconnects the side frames at the points where they begin to converge, and has a function in the operation of the scraper pan and automatic door, as will be described.

From Fig. 1, it will be noted that the forward ends of the side frames are substantially higher than the rear ends, and each frame includes a top rail 5 sloping from front to rear. Rails 5, for a purpose to be described, are preferably inwardly or downwardly facing channels. Beneath an intermediate section of top rail 5, each frame includes a frame element 4 forming a short runway or track inclined in the same direction as the top rail but at a considerably greater angle to the horizontal. Rearwardly tilted frame elements at each end of track 4 form roller stops therefor.

A scraper pan 9, having a forward open end closed by an automatically operable door is supported by the side frames through the medium of three pairs of rollers, all of these being mounted adjacent the upper edges of the pan side walls. The forward pair of rollers 10 is adapted to roll on the inclined runways 4, and the rear pair 11 is adapted to roll on the inclined top rails 5, while the pair 12, which is located forwardly of and beneath the pair 11, is adapted to roll on the underside of the runway 5 so as to prevent tipping of the rear end of the pan during digging. Topping the scraper pan 9 is an intermediate pair of sheaves 13 mounted on an axle 14 connecting two opposite lateral walls of the pan. Passing around the sheaves 13 and 7 is a single hoisting rope 15 coming around the orientable sheaves 6 from a winch drum mounted on the tractor, whereby the sheaves 13 may be caused to move towards, or away from, the sheaves 6 and 7. An abutment 16 mounted on the tow frame is adapted to meet the axle 14 of sheaves 13.

Figure 4:
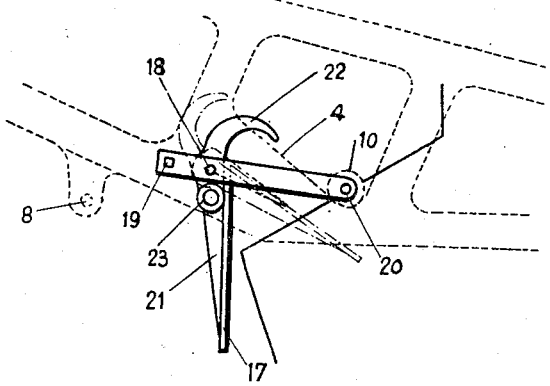

The scraper pan door consists of a ribbed iron sheet 17 hinged at its upper edge, as at 18 to two side-bars 19 loosely pivoted at their rear ends, laterally of the pan, on the axle 20 carrying the pair of rollers 10. Two side-ribs 21 of the door are extended upwardly to form stops 22 each adapted to abut against the corresponding side-bar 19 so as to prevent the door from swinging outwardly. Rotatably mounted on the inner surfaces of the side frames are rollers 23 (Figs. 1 and 4) adapted to serve as sliding abutments for the slide-bars 19 under conditions described hereinafter.

Figure 3:
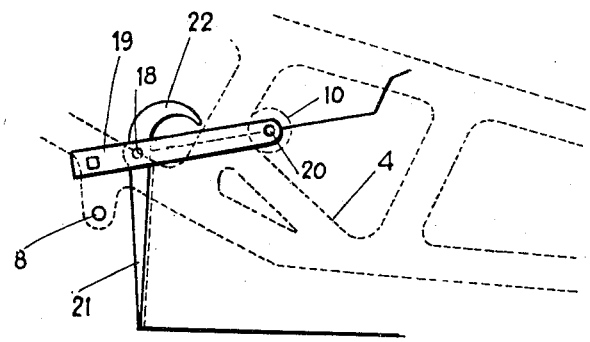
Figs. 3, 4 and 5 are partial side elevation views showing a scraper pan door in different operative positions of the apparatus of Figs. 1 and 2.

The scraper pan may assume any one of three different operative positions, including a substantially horizontal transport position, an inclined digging or scraping position, and a tilted discharge position. The scraper operates as follows:

When the scraper pan 9 is in its transportation position, i. e., in the substantially horizontal position, its rollers 10 are at the highest points of their travels on the runways 4, and its rollers 11 and 12 are in the corresponding positions on, and beneath, the runways 5, respectively, while the stops 22 press against the side-bars 19, as shown in Figs. 1 and 3. In these conditions, the door cannot move outwardly; nor can it move inwardly when the pan is filled with material pressing against the door. When the pan is empty, its jolting during the transportation may make the door swing to a small extent inwardly.

For the digging or scraping operation, the hoisting rope 15 is payed out. The scraper pan 9, due to its weight, then descends by gravity, with its rollers rolling on the runways 4 and 5, until the rollers 10 abut against the roller stops at lowermost ends of runways 4, whereby the cutting edge carried by the forward end of the pan is caused to engage material to be handled, the pan having thus moved to its inclined scraping position designated by 9' (Fig. 1) and its rollers to positions designated by 10', 11' and 12', while its sheaves 13 have moved to a position designated by 13'. During such movement of pan 9, the door moves from the position of Fig. 3 to that of Fig. 4. The outer ends of links 19 move along lines parallel to runways 4, clearing the cross member 8, until the links engage rollers 23. These rollers arrest downward movement of links 19, during further rearward and downward movement of pan 9, so that the links swing clockwise relative to the pan. The door is thus swung away from the front of the pan, so that its lower edge is maintained at a distance of at least say 10 cm. from the ground, whatever may be the depth of the penetration of the forward end of the pan. This depth, which is about 20 cm., may be adjusted by operating the hoisting rope 15. The tractor dragging the scraper causes the pan to be filled automatically. The rollers 11 and 12, now in the positions 11' and 12', respectively, cooperate to prevent excessive penetration of the forward end of the pan into the material handled by arresting upward movement of the pan rear end. If in the course of operation an obstacle, such as a larger stone or a stub be encountered by the lower edge of the pan door, the latter may swing inwardly about its pivot on links 19, as indicated by dot-and-dash lines in Fig. 4, and thereafter swing outwardly.

When the scraper pan is filled, the tractor winch is set in operation so as to haul in the hoisting rope 15, whereby the pan is caused to rise on the runways 4 and 5 until is assumes the substantially horizontal transportation position shown in full lines in Fig. 1.

Figure 5:
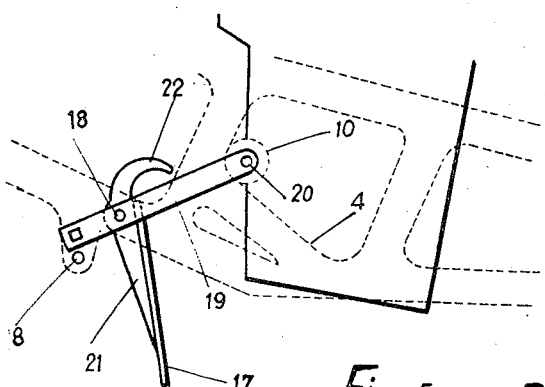

When the dumping point is reached, the winch is set again in operation to pull the hoisting rope 15 so as to cause the sheaves 13, hence the loaded pan, to move towards the sheaves 7. However, the pan cannot accomplish such motion by further following its runways 4 and 5, since the rollers 10 are engaged with the forward roller stops of the runways 4. On the other hand, the rollers 12 are aligned with openings 24 provided in the upper surfaces of top rails 5 so as to enable the rollers 12 to freely move upwardly when the pan is in the transportation position. Under these conditions, the hauling in of rope 15 causes the pan to swing upwardly about the axle 20 carrying the rollers 10, until the axle 14 carrying the sheaves 13 engages the abutment 16 provided on the tow frame; at this instant, the pan 9 assumes the dotted line position designated by 9'' in Fig. 1 for its emptying operation, its sheaves 13 having passed over to the position 13'', while the rollers 11 and 12 have been moved together with the pan over the positions 11'' and 12'', respectively. Meanwhile, the side-bars 19 (Fig. 5) have engaged the tie-rod 8 so as to immobilize the door with its lower edge held at a distance of about 20 cm. from the ground, and to open the intake-end of the pan thereby permitting the pan to empty automatically by gravity.

When the pan is discharged the hoisting rope 15 is payed out, whereupon the pan is caused by its weight to swing backwards about the same axle 20. In the course of this backward motion the pan door closes and the pan finally returns to its transportation position, with its guide-rollers 11 and 12 set again in their positions on the runways 5.

The invention scraper has numerous novel advantages both from the construction and the operation standpoints. Only a single cable or rope is required to operate the scraper pan and control its door, thus requiring only a single winch with a simple control. The operating cable, being above the scraper pan, never engages the material handled and is thus subject only to traction and sheave friction stresses. No gearing is required for the scraper pan or door operation, such being effected solely through rollers operating on inclined runways, with the door operation being completely automatic. Additionally, the scraper is simple in construction, economical in operation, and capable of long use with a minimum of maintenance, as the rollers are subject to very little wear and only a minimum number of journals are required.

While a specific embodiment of the invention has been shown and described to illustrate the application of the invention principles, it should be understood that the invention may be otherwise embodied without departing from such principles.

What I claim is:

1. A scraper comprising, in combination, a wheeled carriage arranged to be towed by a traction vehicle and including a pair of laterally spaced side frames, each side frame including a rectilinear rail sloping rearwardly and downwardly at a pre-set angle to the horizontal, a rectilinear runway disposed beneath said rail and sloping rearwardly and downwardly at an angle to the horizontal greater than such pre-set angle, and elements at each end of said runway forming front and rear stops for said runway; a scraper pan having a bottom, a pair of laterally spaced side walls, and a rear wall, and disposed between said side frames; a first pair of rollers mounted on the upper forward parts of the pan side walls and rolling on said runways; a second pair of rollers mounted on the upper rearward parts of the pan side walls and rolling on said rails; said pairs of rollers supporting said pan on said frames; means operatively connected to the pan intermediate its ends and above said pairs of rollers to draw said pan forwardly along said side frames; the vertical spacings of said pairs of rollers from the pan bottom being so interrelated that, when said means has been operated to draw said pan forwardly along said frames until said first pair of rollers engages the forward stops of said runways, the rearward pair of rollers will have moved upwardly along said rails to such an extent that the pan bottom will be in spaced, substantially parallel relation to the supporting surface for the carriage wheels, providing a material transporting position; said forward stops then arresting further forward movement of said first pair of rollers so that further operation of said drawing means will tilt the pan upwardly about the axis of said forward pair of rollers to a material discharge position; said forward pair of rollers, upon rearward movement of said pan along said side frames from the transporting position, descending faster than the rearward pair of rollers, due to the steeper slope of said runways, to tilt the pan to the digging position, and said rear runway stops restraining rearward pan movement in the digging position, thereby relieving strain on said drawing means; and means operable, in the digging position of said pan, to arrest upward movement of the rear end of the pan.

2. A scraper as claimed in claim 1 including means mounted on said side frames, in the path of tilting movement of said pan about the axis of said first pair of rollers, to engage said drawing means to limit such tilting movement.

3. A scraper as claimed in claim 1 in which said second pair of rollers roll on the upper surfaces of said rails and said last-named means comprises a third pair of rollers disposed beneath said second pair and rolling on the undersurfaces of said rails, the latter being formed with openings alignable with said third pair of rollers in the transporting position of the pan to provide for tilting of said pan to the discharge position.

4. A scraper as claimed in claim 1 including a door pivotally supported on the forward end of said pan and movable by gravity to a closing position in the transport position of the pan; cooperating stop means on said door and frame operable, during tilting of said pan to the discharge position, to swing said door open; and other stop means on said frame, cooperable with the door stop means during rearward and downward movement of said pan to the digging position, to swing said door open.

5. A scraper as claimed in claim 1 including a pair of laterally spaced, interconnected links pivoted on the axis of said first pair of rollers and projecting forwardly from said pan; a door pivotally suspended from intermediate points on said links and movable by gravity to close the pan in the transport position of the latter; means on said door engageable with said links to limit outward swinging of the door relative to said links; stop means on said frame, in advance of said forward runway stops, operable to engage the free ends of said links during tilting of said pan to the discharge position, to swing the links relative to said pan to open said door; and other stop means on said frame engageable with said links, during movement of said pan downwardly and rearwardly to the digging position, to arrest downward movement of said links to swing said door open.

6. A scraper as claimed in claim 1 in which said drawing means comprises sheave means mounted intermediate the ends of said pan above said rollers; sheave means on the forward end of said frame; a pulley dirigibly mounted on the forward end of said frame; and a flexible linear element trained over both of said sheave means and around said pulley and attachable to a winch or the like on a tractor pulling said carriage.

BERNARD LUCIEN DÉSIRÉ LAMY.

REFERENCES CITED

The following references are of record in the file of this patent:

UNITED STATES PATENTS

| Number | Name | Date |
|---|---|---|
| 1,394,350 | Powers | Oct. 18, 1921 |
| 2,088,091 | Moore | July 27, 1937 |
| 2,256,051 | Haile | Sept. 16, 1941 |
| 2,425,664 | Zakel | Aug. 12, 1947 |

FOREIGN PATENTS

| Number | Country | Date |
|---|---|---|
| 19,808/29 | Australia | May 13, 1930 |